(12) United States Patent
Mongold

(10) Patent No.: US 7,826,692 B2
(45) Date of Patent: Nov. 2, 2010

(54) CONNECTOR ASSEMBLY

(75) Inventor: John A. Mongold, Middletown, PA (US)

(73) Assignee: Samtec, Inc., New Albany, IN (US)

( * ) Notice: Subject to any disclaimer, the term of this patent is extended or adjusted under 35 U.S.C. 154(b) by 623 days.

(21) Appl. No.: 11/762,599

(22) Filed: Jun. 13, 2007

(65) Prior Publication Data

US 2008/0112707 A1    May 15, 2008

Related U.S. Application Data

(60) Provisional application No. 60/865,634, filed on Nov. 13, 2006.

(51) Int. Cl.
*G02B 6/12* (2006.01)
*H04B 10/00* (2006.01)

(52) U.S. Cl. .................................... 385/14; 398/117

(58) Field of Classification Search ............... 385/14; 398/117
See application file for complete search history.

(56) References Cited

U.S. PATENT DOCUMENTS

2005/0185882 A1*  8/2005  Zack et al. ................... 385/15

* cited by examiner

*Primary Examiner*—Charlie Peng
*Assistant Examiner*—Jerry Blevins
(74) *Attorney, Agent, or Firm*—Keating & Bennett, LLP

(57) ABSTRACT

A connector assembly includes a motherboard and a connector. The motherboard defines a first plane and includes at least one fiber trace. The connector includes an optical lens, an electrical/optical converter, an electrical connector, and a circuit board connecting the optical lens and the electrical connector. The optical lens can be arranged to receive and transmit light from the at least one fiber trace in a direction that is parallel or substantially parallel to the first plane. A plane defined by at least a portion of a main surface of the circuit board is perpendicular or substantially perpendicular to the first plane. The at least one fiber trace is arranged to transmit light to and away from an edge of the motherboard and is arranged to receive light at the edge of the motherboard.

14 Claims, 17 Drawing Sheets

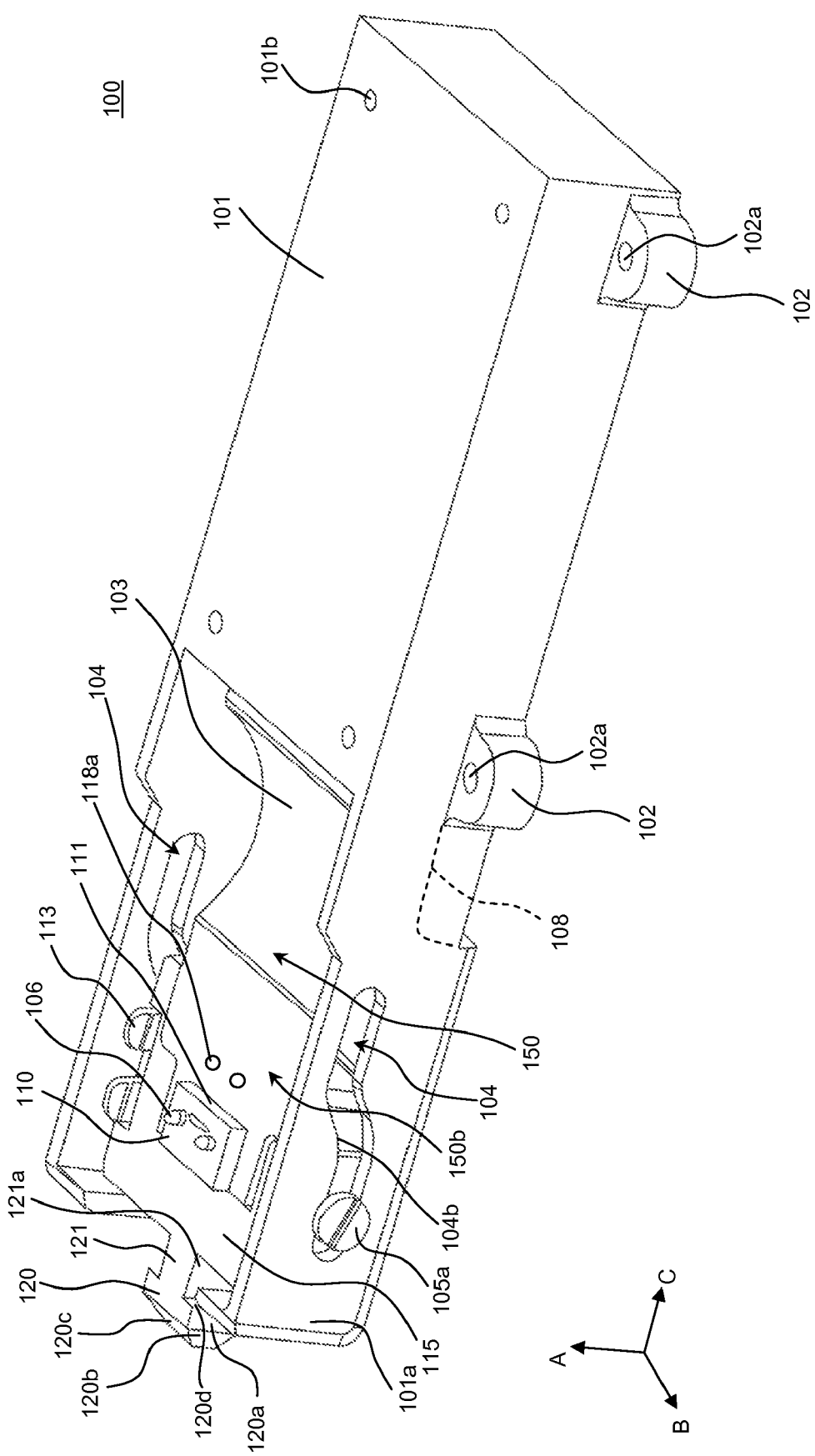

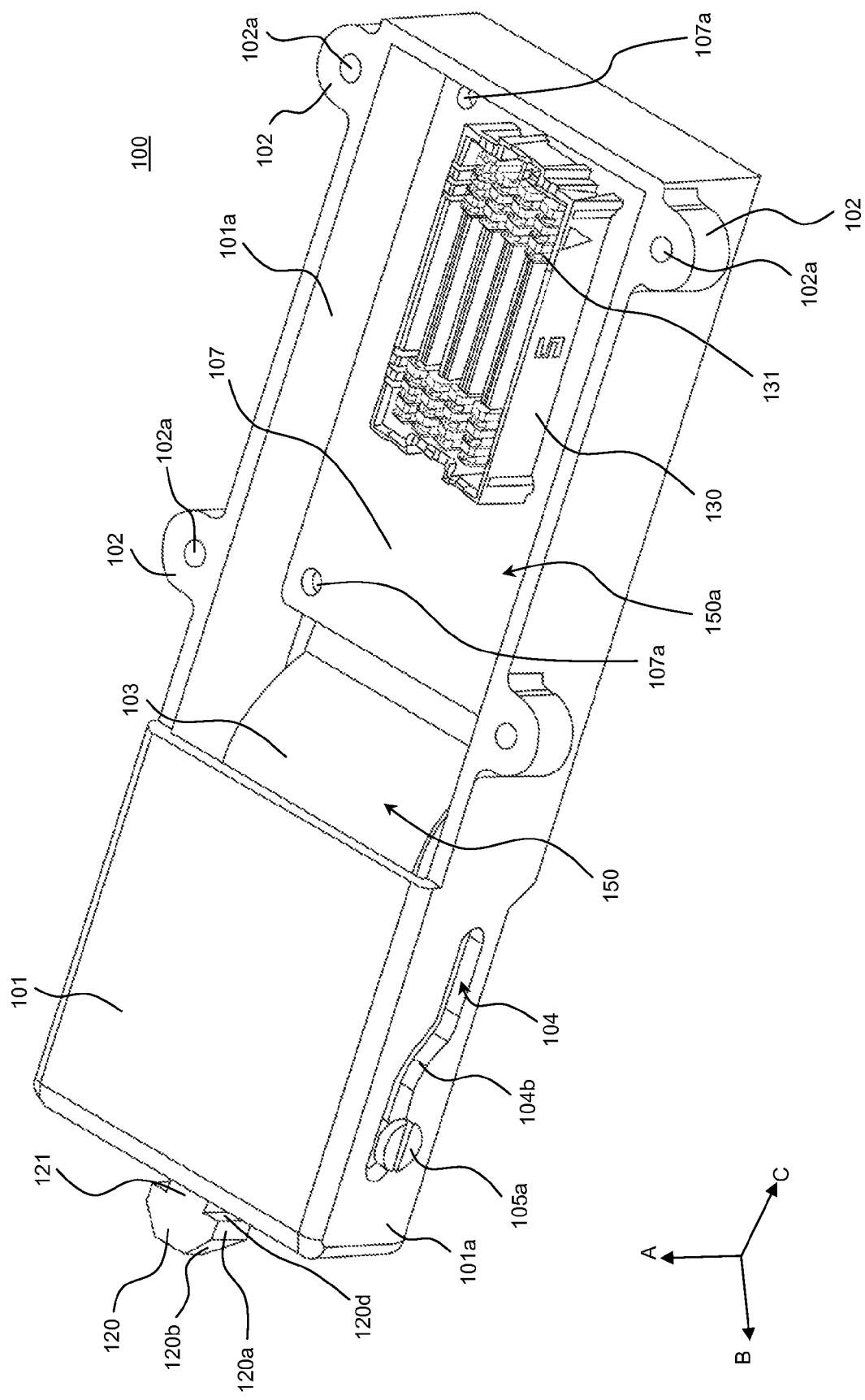

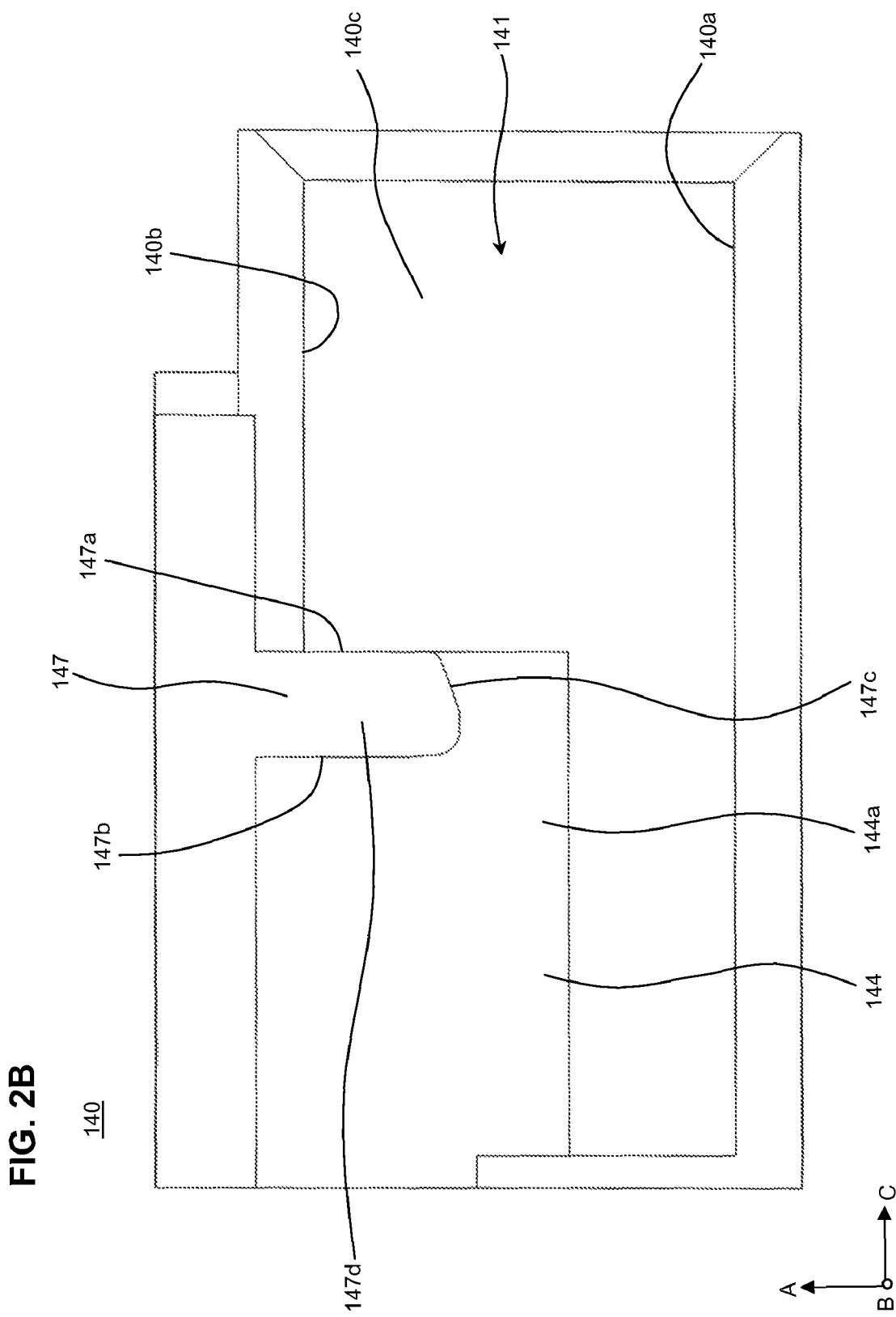

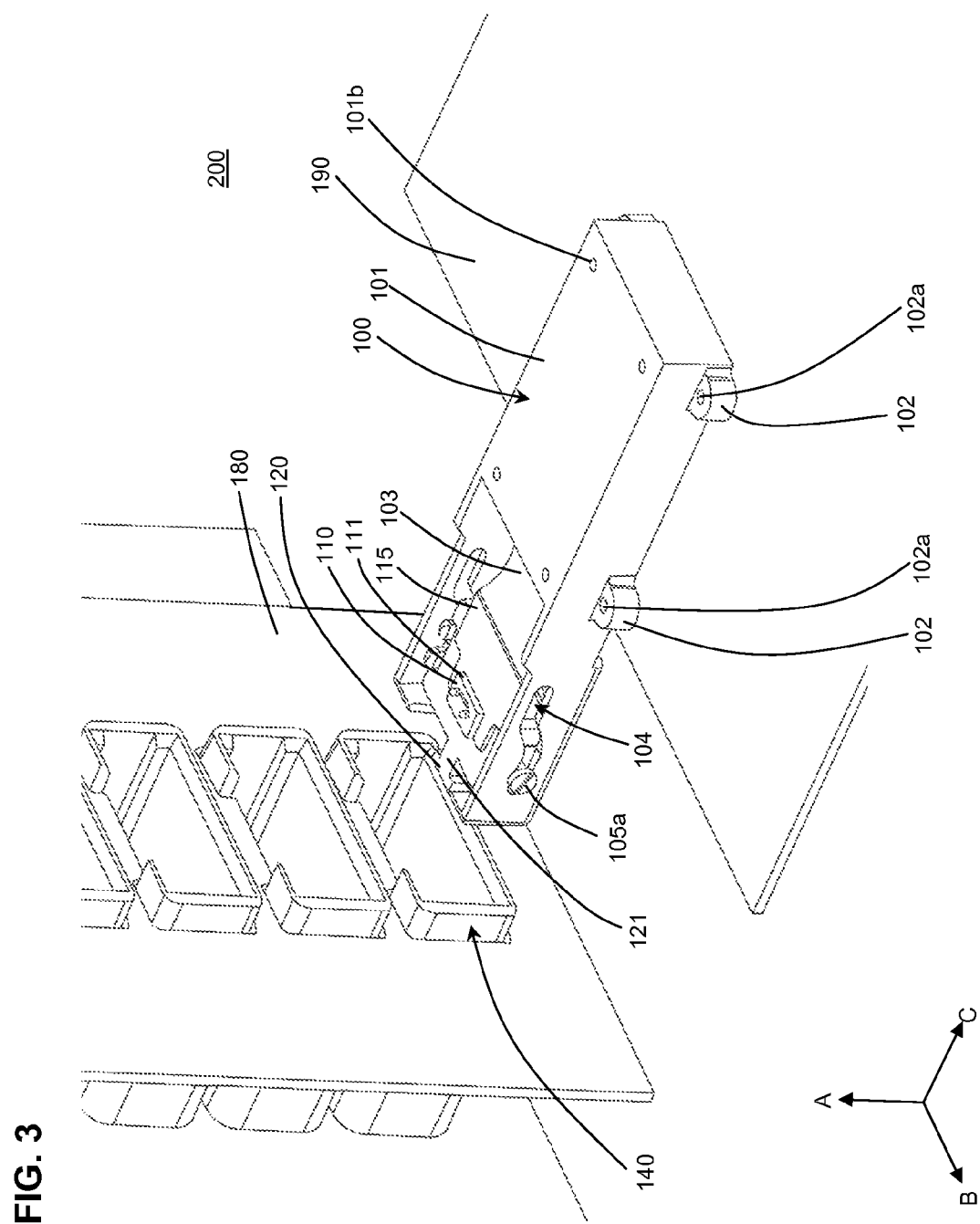

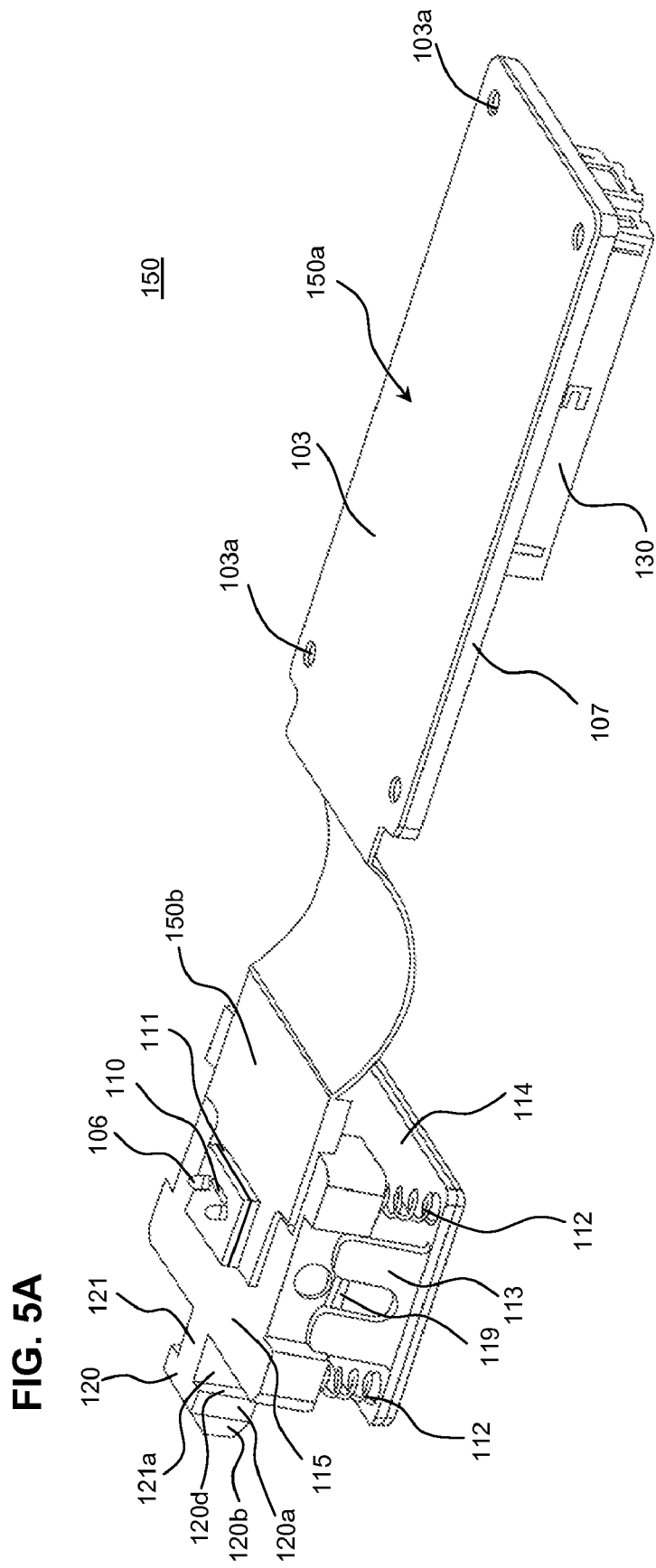

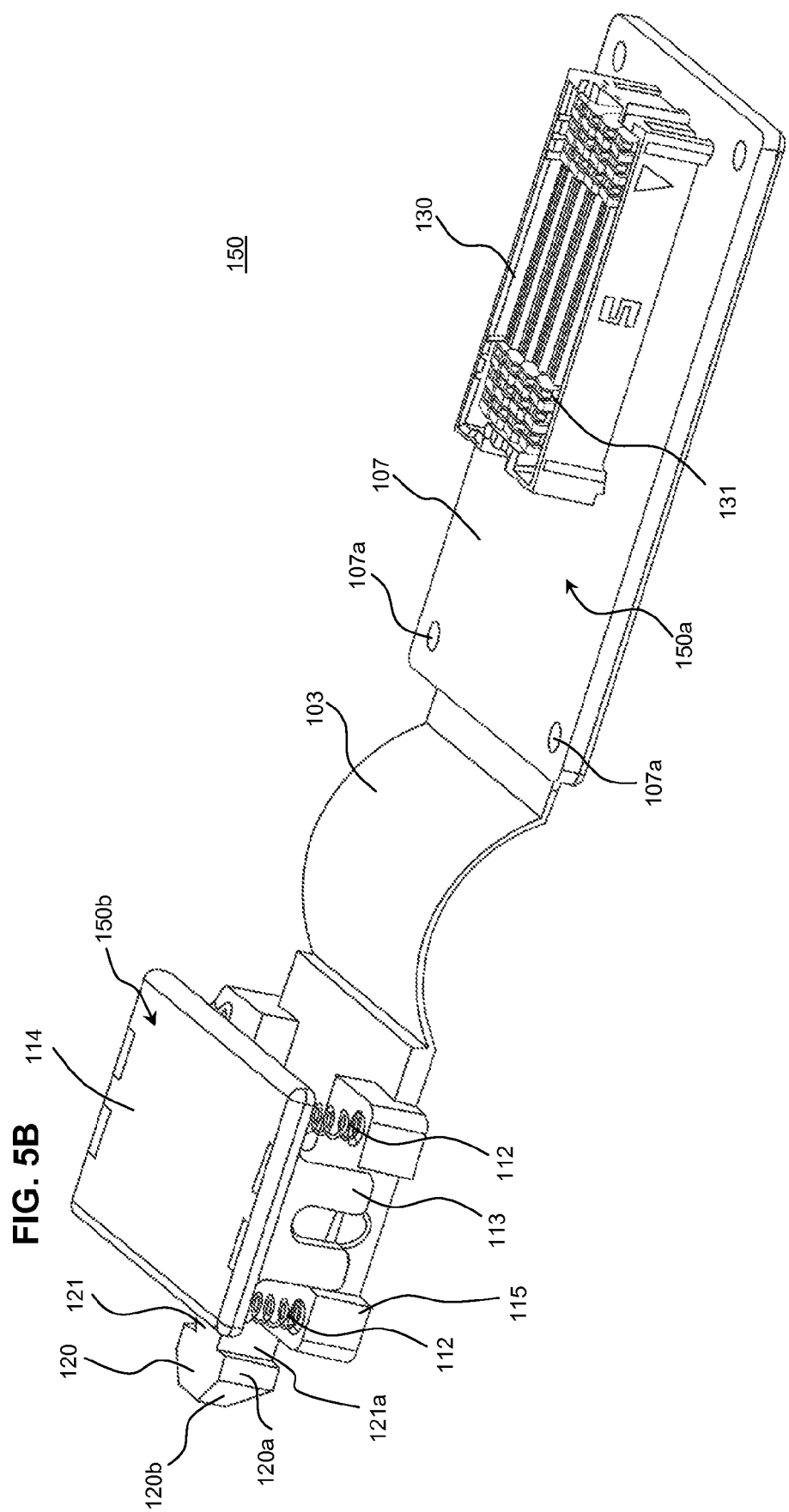

CONNECTOR ASSEMBLY

BACKGROUND OF THE INVENTION

1. Field of the Invention

The present invention relates to connector assemblies. More specifically, the present invention relates to connector assemblies in which light can be converted to electricity and electricity can be converted to light.

2. Description of the Related Art

It is known in the art to use both light and electricity to transmit signals. While electricity can be transmitted quickly, light can be transmitted even more quickly. In applications in which signals need to be transmitted extremely quickly, it is preferable to use light to transmit signals. Light can be transmitted by fiber optic cables or by fiber optic traces ("fiber traces") arranged on or embedded within a circuit board. In applications in which the signal is transmitted over long distances, it preferable to use fiber optic cables. In applications in which speed is important, it is preferable to use fiber traces where cabling is not applicable.

It is known in the art that, when light is used to transmit signals, it is sometimes necessary to convert light into electricity in order to easily modify the signals. In some applications that convert light into electricity, the electricity is converted back into light. Prior to the present invention, it was not possible to provide a pluggable connector that transmits light signals in fiber traces on or in a circuit board defining a first plane to electric signals in a second plane that is perpendicular or substantially perpendicular to the first plane in a reliable and consistent way.

SUMMARY OF THE INVENTION

To overcome the problems described above, preferred embodiments of the present invention provide a pluggable connector that reliably and consistently connects a signal transmitted by light in fiber traces to an edge of a circuit board or other suitable device defining a first plane to signals transmitted by electricity in a second plane that is perpendicular or substantially perpendicular to the first plane.

According to a preferred embodiment of the invention, a connector includes an optical lens, an electrical/optical converter, an electrical connector, and a flexible circuit connecting the optical lens and the electrical connector.

The connector can further include a housing and a platform, where the platform is located in the housing and is movable within the housing. The optical lens and the electrical/optical converter can be located on the platform.

The housing can include at least one cam follower. The platform can include a cam member that is located in the cam follower and is movable within the cam follower. Preferably, the location of the platform in a vertical direction with respect to a bottom surface of the housing is determined by the location of the cam member within the cam follower.

The connector can also include a base that is connected to the platform, that is located within the housing, and that is movable within the housing. The base is preferably connected to the platform by at least one spring.

One end of the flexible circuit is preferably movable within the housing, and the other end of the flexible circuit is preferably attached to the housing so as not to be movable with respect to the housing. The optical lens is preferably attached to the one end of the flexible circuit that is movable within the housing.

The optical lens is preferably arranged to float as the connector is mated to a motherboard. The optical lens of the connector is preferably arranged to make contact with an optical lens of a motherboard as the connector is mated to the motherboard such that only the mating of the connector and the motherboard is required for the optical lens of the connector and the optical lens of the motherboard to make contact.

The optical lens is preferably arranged to make contact with an optical lens of a motherboard before the connector is fully mated with the motherboard. Preferably, the optical lens of the connector is arranged such that, during mating and un-mating of the connector and a motherboard, the optical lens is parallel or substantially parallel to an optical lens of the motherboard. The optical lens of the connector is preferably arranged such that, as the connector is mated to a motherboard, only normal forces are applied to the optical lens of the connector and an optical lens of the motherboard.

According to another preferred embodiment of the present invention, a connector assembly includes a motherboard and a connector. The motherboard defines a first plane and has at least one fiber trace. The connector includes an optical lens, an electrical/optical converter, an electrical connector, and a circuit board connecting the optical lens and the electrical connector. The optical lens can be arranged to receive and transmit light from the at least one fiber trace in a direction that is parallel or substantially parallel to the first plane. The plane defined by at least a portion of a main surface of the circuit board is perpendicular or substantially perpendicular to the first plane. The at least one fiber trace is arranged to transmit light to and away from an edge of the motherboard and is arranged to receive light at the edge of the motherboard. The circuit board is preferably a flexible circuit board.

The connector can include a housing, where the optical lens is movable with respect to the housing. The connector assembly can include a docking block located within the motherboard, where the housing and the docking block are arranged to have three sets of corresponding guide planes that are each used to locate the optical lens with respect to the at least one fiber trace.

Preferably, the side walls of the docking block and the sides of the housing define the first set of guide planes. The docking block can include at least one nose guide, and the connector can include a platform upon which the optical lens is mounted and which includes a nose. Preferably, the side surface of the at least one nose guide and the side surface of the nose define the second set of guide planes. The docking block can include at least one neck guide extending from at least one nose guide. Preferably, the side surface of the at least one neck guide and the side surface of the neck define the third set of guide planes.

Preferably, the connector assembly further includes a housing for the connector and a platform located within the housing and arranged to be movable with respect to the housing, where the housing includes at least one cam follower, where the platform includes at least one cam member, and where the vertical height of the platform with respect to a bottom surface of the housing is determined by the location of the cam member within the cam follower.

Preferably, the connector assembly further includes a platform upon which the optical lens is attached and a base having at least one spring, where the at least one spring of the base supports the platform. The optical lens is preferably arranged to receive and transmit light from the at least one fiber trace by moving the base and platform with respect to the housing.

The optical lens is preferably arranged to float as the connector is mated to the motherboard. The optical lens of the connector is preferably arranged to make contact with an optical lens of the motherboard as the connector is mated to the motherboard such that only the mating of the connector and the motherboard is required for the optical lens of the connector and the optical lens of the motherboard to make contact. The optical lens is preferably arranged to make contact with an optical lens of the motherboard before the connector is fully mated with the motherboard.

The optical lens of the connector is preferably arranged such that, during at least a portion of mating and un-mating of the connector and the motherboard, the optical lens is parallel or substantially parallel to an optical lens of the motherboard. The optical lens of the connector is preferably arranged such that, when the connector is mated to the motherboard, only normal forces are applied to the optical lens of the connector and an optical lens of the motherboard.

Other features, elements, steps, characteristics, and advantages of the present invention will become more apparent from the following detailed description of preferred embodiments of the present invention with reference to the attached drawings.

BRIEF DESCRIPTION OF THE DRAWINGS

FIGS. 1A and 1B are perspective top and bottom views, respectively, of the connector according to a preferred embodiment of the present invention.

FIG. 2B is sectional view of the docking block according to a preferred embodiment of the present invention.

FIG. 3 is a perspective view of the connector assembly according to a preferred embodiment of the present invention.

FIGS. 5A-5C are perspective views of a sub-assembly of the connector according to a preferred embodiment of the present invention.

DETAILED DESCRIPTION OF PREFERRED EMBODIMENTS

Figure 2A:
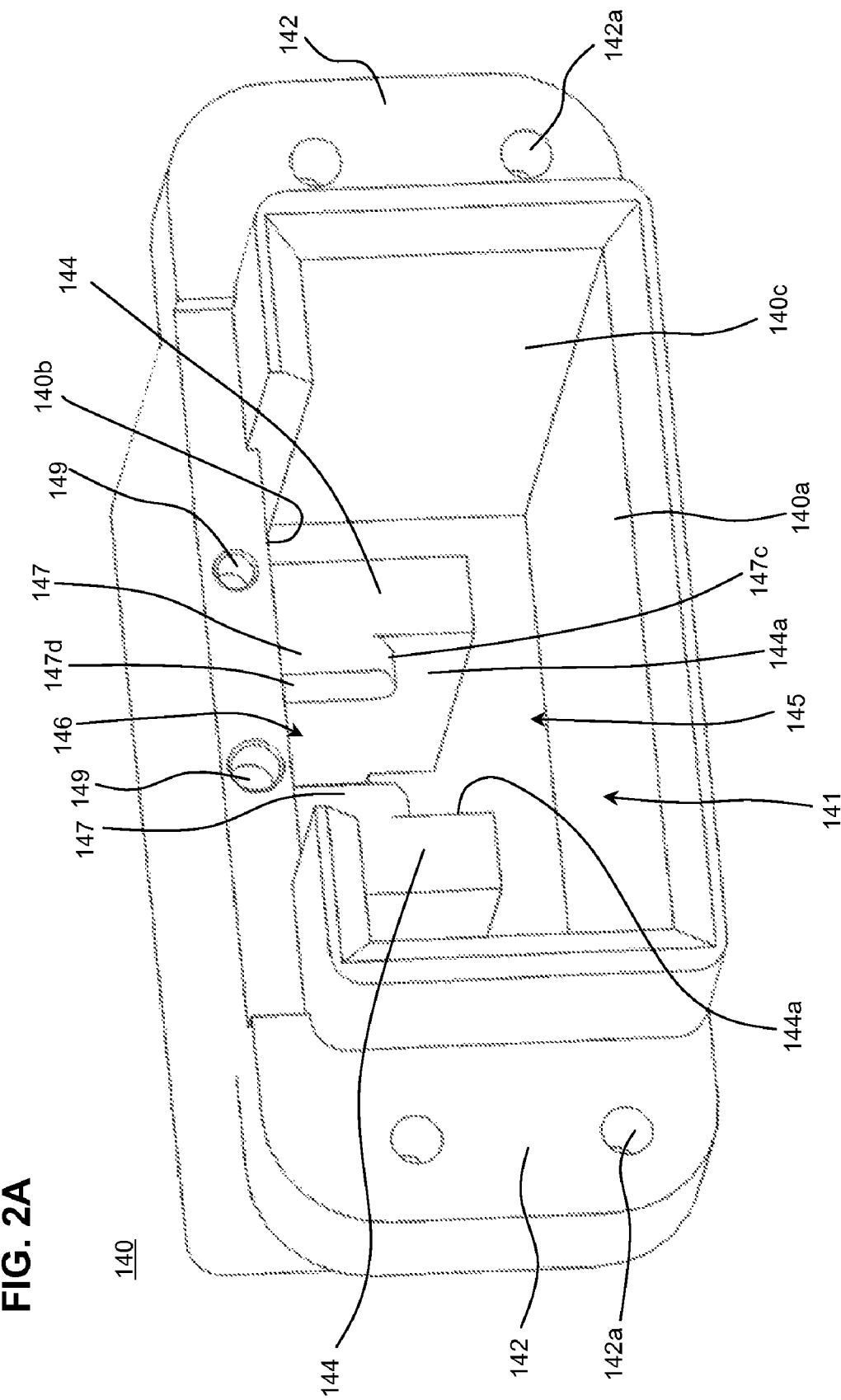
FIG. 2A is a perspective front view of the docking block according to a preferred embodiment of the present invention.

FIGS. 3 and 4A-4D show the connector assembly 200 according to a preferred embodiment of the present invention. FIG. 3 shows the connector assembly before the connector 100 is inserted into docking block 140. Connector assembly 200 includes motherboard 180 and docking block 140 as a female part and daughterboard 190 and connector 100 as a male part. As shown in FIGS. 4A-4D, the connector 100, which is attached to the daughterboard 190, can be inserted into or removed from the docking block 140, which is attached to the motherboard 180. The connector 100 includes housing 101 and, as shown in FIGS. 5A and 5B, sub-assembly 150. First, the connector 100, including the sub-assembly 150, and the daughterboard 190 will be described; second, the docking block 140 and motherboard 180 will be described; and third, the operation of the connector assembly 200 will be described.

Connector 100 and Daughterboard 190

Figure 5C:
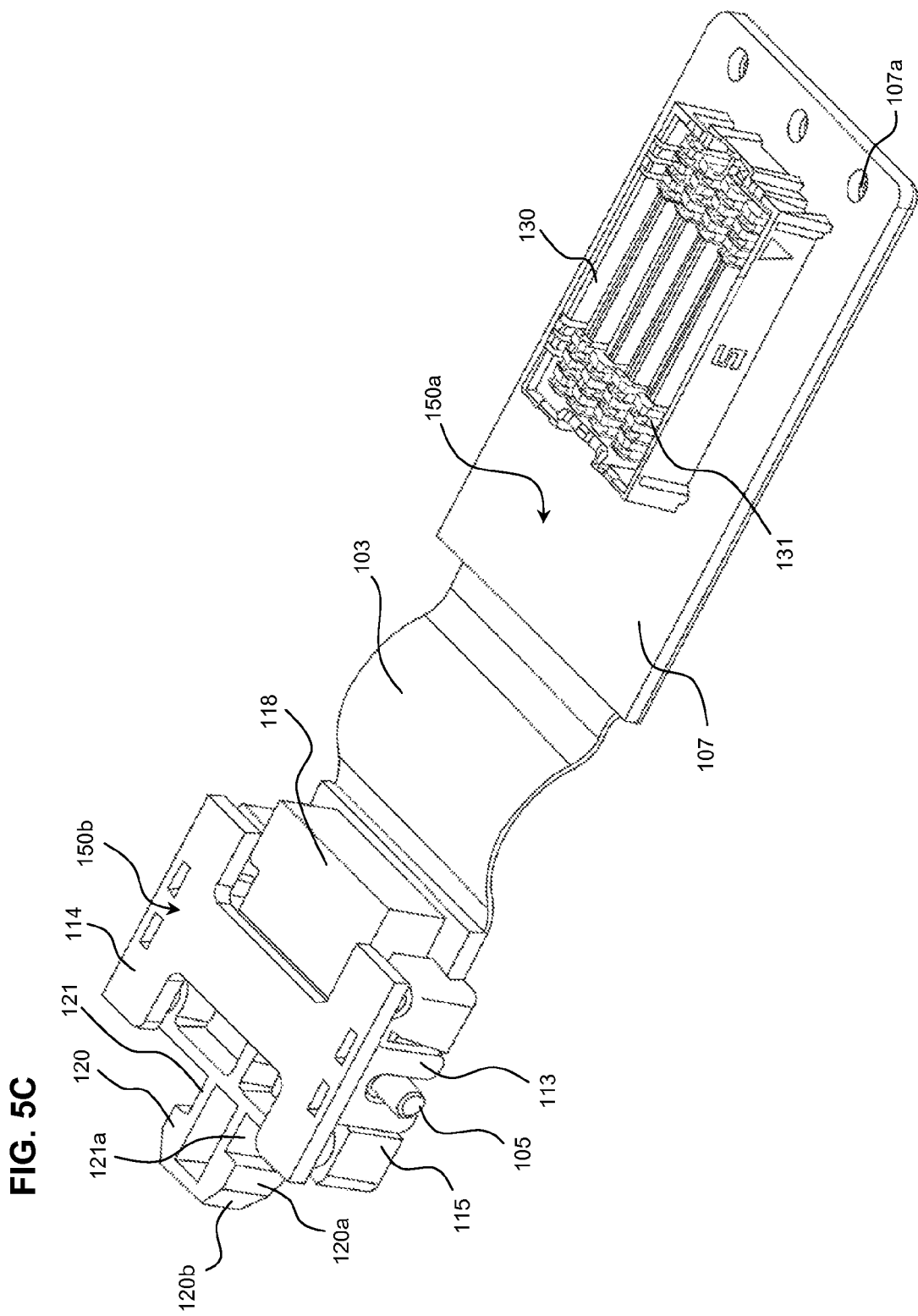
Figure 6:
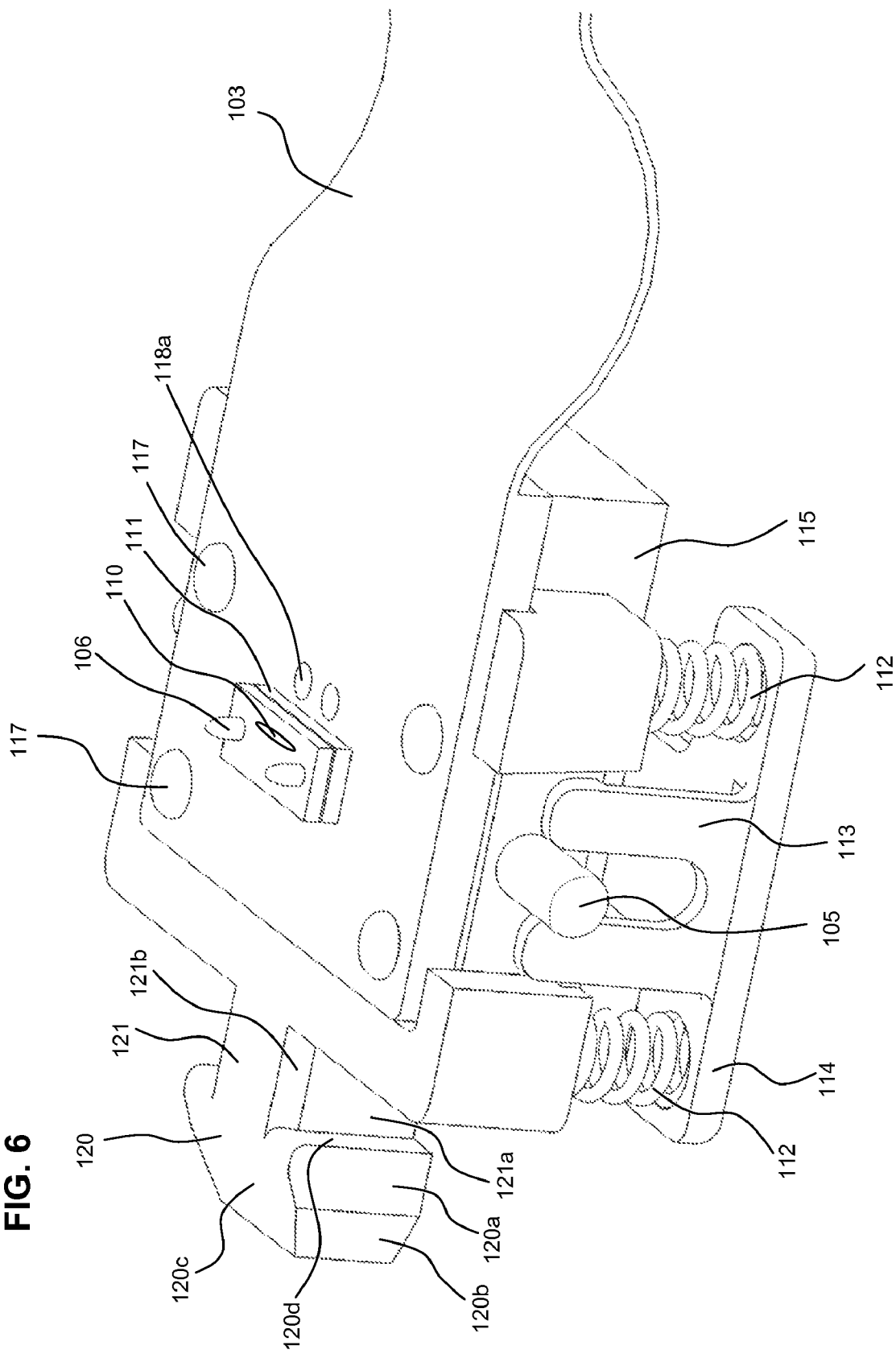
FIG. 6 is a close-up perspective view of one end of the sub-assembly of the connector according to a preferred embodiment of the present invention.

FIGS. 1A and 1B show the connector 100 according to a preferred embodiment of the present invention. FIGS. 5A, 5B, and 6 show the sub-assembly 150 according to a preferred embodiment of the present invention. FIG. 3 shows the connector 100 attached to the daughterboard 190.

Connector 100 can receive light from the motherboard 180 as input through lenses 110. Connector 100 converts this light to electricity by electrical/optical converter 111 and outputs the electricity through electrical connector 130 attached to the daughterboard 190. For each of the lenses 110, the light can be converted into electricity and output through a single contact 131 of the electrical connector 130 or output through a plurality of the contacts 131 of the electrical connector 130. Outputting electricity to a plurality of contacts 131 of the electrical connector 130 can be accomplished either (a) on or in the flexible circuit 103; or (b) in the electrical/optical converter 111. It is also possible for the lenses 110 to output light to fiber traces on the connector 100 (not shown). The fiber traces can also be located on the flexible circuit 103.

Also, connector 100 can receive electricity through the electrical connector 130 attached to daughterboard 190. Connector 100 converts this electricity to light by electrical/optical converter 111 and outputs the light through lenses 110. For each of the lenses 110, either the electricity from a single contact 131 of the electrical connector 130 or the electricity from a plurality of contacts 131 of the electrical connector 130 can be converted into light by the electrical/optical converter 111.

Typically, separate paths (where a path is defined by the connection between one of the lenses 110 and a contact 131) preferably are used by signals in which light is converted into electricity and by signals in which electricity is converted into light. That is, a first signal defined by light converted into electricity preferably will be transmitted on a different path than a second signal defined by electricity converted into light. However, it is possible that both the first and second signals are transmitted on the same path.

Connector 100 includes a housing 101 and sub-assembly 150 (sub-assembly 150 is shown by itself in FIGS. 5A and 5B). Housing 101 is preferably made of die cast metal. However, any other suitable material can also be used for housing 101, e.g., plastic. Housing 101 includes sidewalls 101a and flanges 102. Flanges 102 include holes 102a, through which screws (not shown) are inserted to attach the connector 100 to daughterboard 190. It is also possible to attach the connector 100 to the daughtercard 190 by other suitable methods, e.g., press fit, snap fit, rivet, solder, glue, or epoxy.

As shown in FIGS. 5A and 5B, sub-assembly 150 includes lenses 110 that are connected to electrical connector 130. Lenses 110 are attached to electrical/optical converter 111, which converts light received through lenses 110 into electricity. Although lenses 110 and electrical/optical converter 111 are shown as separate structures, it is possible that they form an integral structure. The electricity is transmitted to the electrical connector 130 by conductive traces (not shown) on or in the flexible circuit 103. The electrical connector 130 can be any type of electrical connector, including, but not limited to, a single ended connector, a differential pair connector, a mezzanine connector, a right angle connector, etc. The lenses 110 and the end of the flexible circuit 103 are connected to platform 115. As shown in FIG. 6, the flexible circuit 103 can be attached to the platform 115 by heat stakes 117. Alternatively, the flexible circuit 103 can be attached to the platform 115 in any other suitable manner.

The end of the flexible circuit 103 opposite to the end of the flexible circuit 103 with the lenses 110 is attached to the board 107. The electrical connector 130 is also mounted on the board 107. The flexible circuit 103 and the electrical connector 130 can be attached to the board 107 in any suitable manner. The board 107 can be a circuit board or any other suitable device for mounting the electrical connector 130. The electrical connector 130 includes contacts 131 that are connected to one end of vias (not shown) in the board 107. The other end of the vias is connected to the conductive traces of the flexible circuit 103. Typically, one end of the contacts 131 and one end of the conductive traces are soldered to opposites ends of the vias in the board 107. However, other suitable methods, e.g., press fit or compression, can be used to connect contacts 131 and the conductive traces to the vias in the board 107.

The flexible circuit 103 and the board 107 can include either a single layer or multiple layers. Although not shown, it is possible to provide electrical components on or in either the flexible circuit 103 or the board 107 or both. The electrical components can be either passive or active electrical components.

The first end 150a of the sub-assembly 150 includes a portion of the flexible circuit 103, the board 107, and the electrical connector 130. Typically, the flexible circuit 103 and the board 107 are integrally formed. The flexible circuit 103 and the board 107 are attached to the housing 101 preferably by screws (not shown) engaged with holes 107a of board 107, holes 103a of flexible circuit 103, and holes 101b of housing 101, such that the flexible circuit 103 and the board 107 are held against the housing 101.

Instead of screws engaged with holes 101b, 103a, and 107a, any other suitable method can be used to attach the flexible circuit 103 and the board 107 to the housing 101, e.g., glue, epoxy, etc. If screws are used, then it is possible to disassemble the sub-assembly 150 from the housing 101, if this is desired. If glue or epoxy is used, then it is difficult, if not impossible, to disassemble the sub-assembly 150 from the housing 101 without damaging the sub-assembly 150. Although not shown in the figures, it is possible for the housing 101 to include guiding pins for properly locating the housing 101 on the daughterboard 190.

The second end 150b of the sub-assembly 150 includes a portion of the flexible circuit 103, lenses 110, electrical/optical converter 111, base 114, and platform 115. The second end 150b of the sub-assembly 150 is not fixed to the housing 101 and floats in housing 101 such that it is capable of moving within the housing 101. The bottom of base 114 abuts an interior surface of the bottom 101c of the housing 101 and is free to move or slide along a portion of the interior surface of the bottom 101c of the housing 101. The base 114 include springs 112 that support and push the platform 115 away from the bottom 101c of the housing 101.

Although the drawings show an example in which four springs 112 are preferably used, it is possible to use any suitable number of springs, including one spring. Also, it is possible to use any other structure that provides a force. Platform 115 is constrained to move only in a vertical or a substantially vertical direction with respect to the base 114 by latch arms 113 extending from base 114 and the latch stop shelf 119 extending from the platform 115. The cam members, preferably in the form of rods 105, are located on opposing sides of the platform 115. On opposing sides of the base 114 corresponding to the opposing sides of the platform 115 where the cam rods 105 are located, two of the latch arms 113 extend from the base 114 such that the respective cam rods 105 are located between the two latch arms 113. This arrangement of the cam rods 105 and latch arms 113 constrains the movement of the platform 115 in all directions, although vertical motion is possible by compression of the springs 112, with respect to the base 114.

When the sub-assembly 150 is assembled into housing 101, the vertical height of the platform 115 is determined by the location of the cam rods 105 in the cam followers 104 in the side 101a of the housing 101. When the cam rods 105 are located at the end of the cam followers 104 towards the front of the housing 101, the platform 115 is located closest to the interior surface of the bottom 101c of the housing 101, and when the cam rods 105 are located at the end of the cam followers 104 towards the middle of the housing 101, the platform 115 is located furthest from the interior surface of the bottom 101c of the housing 101. Each of the cam followers 104 preferably includes a bump 104b. Bumps 104b are arranged in the cam followers 104 to impede horizontal movement and promote rotating or pivoting of the platform 115 about an axis defined by the cam rods 105. This will be explained in detail below in the Operation of Connector Assembly 200 section.

The exact arrangement, location, and number of cam rods 105 and latch arms 113 is unimportant as long as the platform 115 is constrained to move in a vertical or a substantially vertical direction with respect to the base 114. Further, it is also possible to use structures, such as levers, other than the cam rods 105 and latch arms 113 to constrain the movement of the platform 115 to a vertical or a substantially vertical direction with respect to the base 114. The structures other than cam rods 105 and latch arms 113 must also be able to push the platform 115 away from the bottom 101c of the housing 101. Cam rods 105 can include cam heads 105a as shown in FIGS. 1A and 1B, can have the dowel shape shown in FIG. 6, or can have any other suitable shape. Other suitable structures, e.g., screws, snaps, etc., could be used instead of latch arms 113 and latch stop shelf 119 to constrain movement and hold together the base 114 and platform 115.

Platform 115 can include a heat sink 118. The heat sink 118 is located on the under side of the platform 115 so that it is sandwiched between the platform 115 and the base 114. Heat sink 118 includes protrusions 118a that extend from the heat sink 118 on the under side of the platform 115 through the flexible circuit 103 to the top side of the platform 115. The protrusions 118a can be formed integral with the heat sink 118 before the heat sink is attached to the platform 115, or the protrusions 118a can be formed by filing in holes in the flexible circuit 103 with any suitable material, including metals such as copper, after the heat sink 118 has been attached to the platform 115.

The heat absorbed from the flexible circuit 103, the electrical/optical converter 111, and the platform 115 by the heat sink 118 is dissipated through window 108 in the housing 101. The window 108 is shown in FIGS. 4C and 4E and is shown with dashed lines in FIG. 1A. It is possible to use the heat sink 118 without the window 108 or to use the window 108 without the heat sink 118. However, the rate or amount of heat dissipation would be reduced. It is also possible to not use either of the window 108 or the heat sink 118. However, the rate of heat dissipation would be further reduced.

Platform 115 also includes a neck 121 extending from a side of the platform 115 and includes a nose 120 extending from the neck 121. The shape of the neck 121 preferably is generally of a cube or cuboid (also known as a rectangular parallelpiped), where the top edges of the neck 121 can be beveled edges 121b. The shape of the nose 120 is generally of a cuboid. The maximum vertical height of the nose 120 is the same or substantially the same as the height of the neck 121. As described below, the height of the nose 120 is variable. The horizontal length of the back surface 120d of the nose 120 in contact with the neck 121 is preferably greater than the horizontal length of the surface of the neck 121 in contact with the nose 120. The top surface of the nose 120 preferably is a beveled top surface 120c, and the side surface 120a of the nose 120 can include a beveled side surface 120b. The beveled top surface 120c of the nose 120 is beveled such that the height of the nose 120 decreases in the direction extending away from the surface of the nose 120 in contact with the neck 121. The beveling angles of the beveled side surface 120b, the beveled top surface 120c, and the beveled edges 121b can be either constant or variable. The sides 101a of housing 101, the side surface 120a of nose 120, and the side surface 121a of neck 121 form three sets of guide planes for locating the lenses 110 of the connector 100 in the horizontal direction B with respect to the lenses 187 attached to the motherboard 180. The purpose for the arrangement of the three guide planes will be explained in detail below in the Operation of the Connector Assembly 200 section. The arrangement of the three sets of guide planes can be carried out in other suitable manners.

The flexible circuit 103 is attached to the platform 115. The flexible circuit 103 in FIG. 6 is attached to the platform 115 preferably by heat stakes 117. However, the flexible circuit 103 can be attached to the platform 115 in any other suitable manner, e.g., glue, epoxy, adhesive, insert mold, screw, weld, etc. The electrical/optical converter 111 is attached to the flexible circuit 103. The lenses 110 are attached to the electrical/optical converter 111 such that the lenses 110 can receive or transmit light in the vertical direction A. Although connector 100 preferably uses a plurality of lenses 110, the exact number of lenses is not important, and any suitable number of lenses can be used, including a single lens.

As discussed above, electrical/optical converter 111 converts incident light to electricity and converts incoming electricity to light. For light incident on the lenses 110, the light enters the lenses 110 from fiber traces 185 (only shown in FIG. 7C) in the vertical direction A or in substantially vertical direction. The incident light and fiber traces 185 will be explained in detail below in the Docking Block 140 and Motherboard 180 section.

Each of the lenses 110 focuses or collimates the incident light from each of the fiber traces 185 onto a corresponding converter in the electrical/optical converter 111. Each of the converters converts the light into electricity, which is then transmitted to a corresponding conductive trace in the flexible circuit 103.

For incoming electricity, the conductive traces transmit the incoming electricity to a corresponding converter in the electrical/optical converter 111. Each of the corresponding converters converts the electricity into light. This light is focused or collimated by lenses 110 and is outputted to the fiber traces 185 on the motherboard 180.

The portion of the flexible circuit 103 upon which the electrical/optical converter 111 is attached and the immediately surrounding portions of the flexible circuit 103 are arranged in a plane that is perpendicular or substantially perpendicular to the vertical direction, i.e., the plane defined by these portions of the flexible circuit includes the horizontal directions B and C. A substantial portion of the flexible circuit 103 is arranged in a plane or planes that are perpendicular or substantially perpendicular to the vertical direction A. A portion of the flexible circuit 103 between the platform 115 and the electrical connector 130 is not arranged in a plane that is perpendicular or substantially to the vertical direction A, which allows the platform 115 to be moved within the housing 101. The electrical/optical converter 111 includes alignment pegs 106 that are arranged in the vertical direction A. The function of the alignment pegs 106 will be explained in detail below in the Operation of the Connector Assembly 200 section.

Together, the connector 100 and the daughterboard 190 define the male portion of the connector assembly 200 that can be inserted into and removed from the docking block 140, which will be discussed in detail below in Docking Block 140 and Motherboard 180 section. The connector 100 is constructed such that it can be inserted into and removed form the docking block 140 many times. For example, if the connector 100 fails for some reason or if a different connector 100 is needed, then it is possible to replace the connector 100 with another one.

Docking Block 140 and Motherboard 180

Figure 7A:
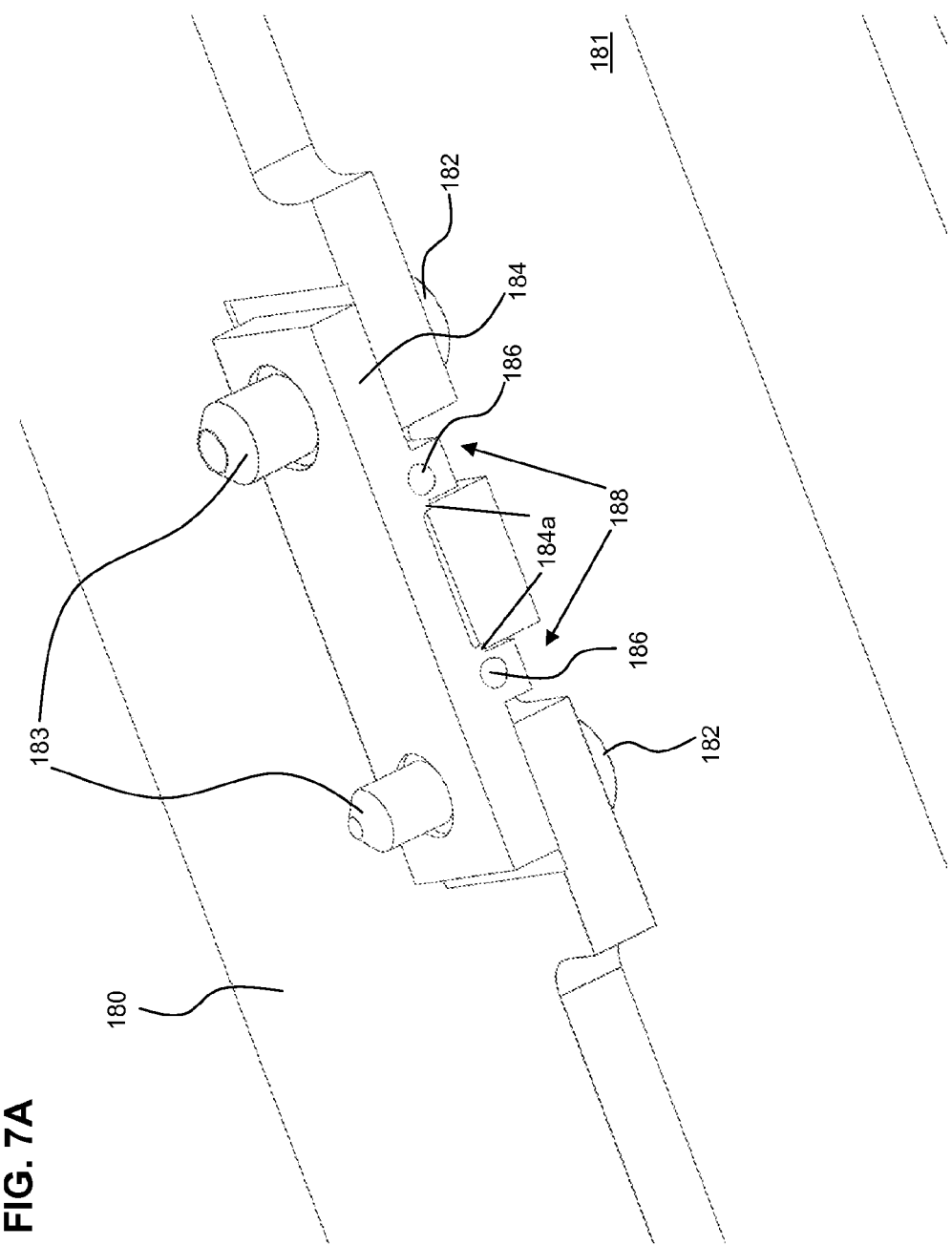
FIGS. 7A-7C is close-up views of the motherboard according to a preferred embodiment of the present invention.
Figure 7B:
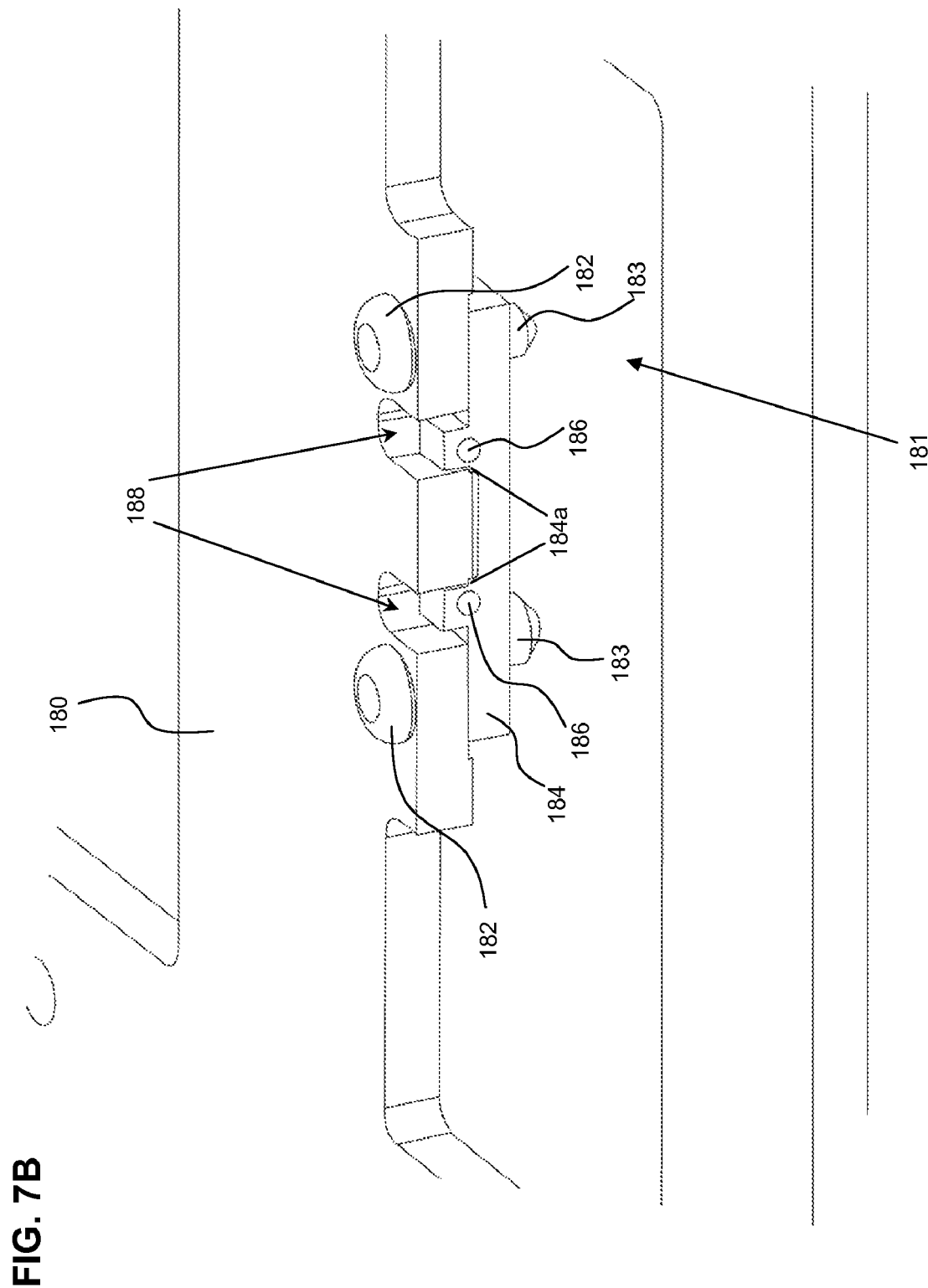
Figure 7C:
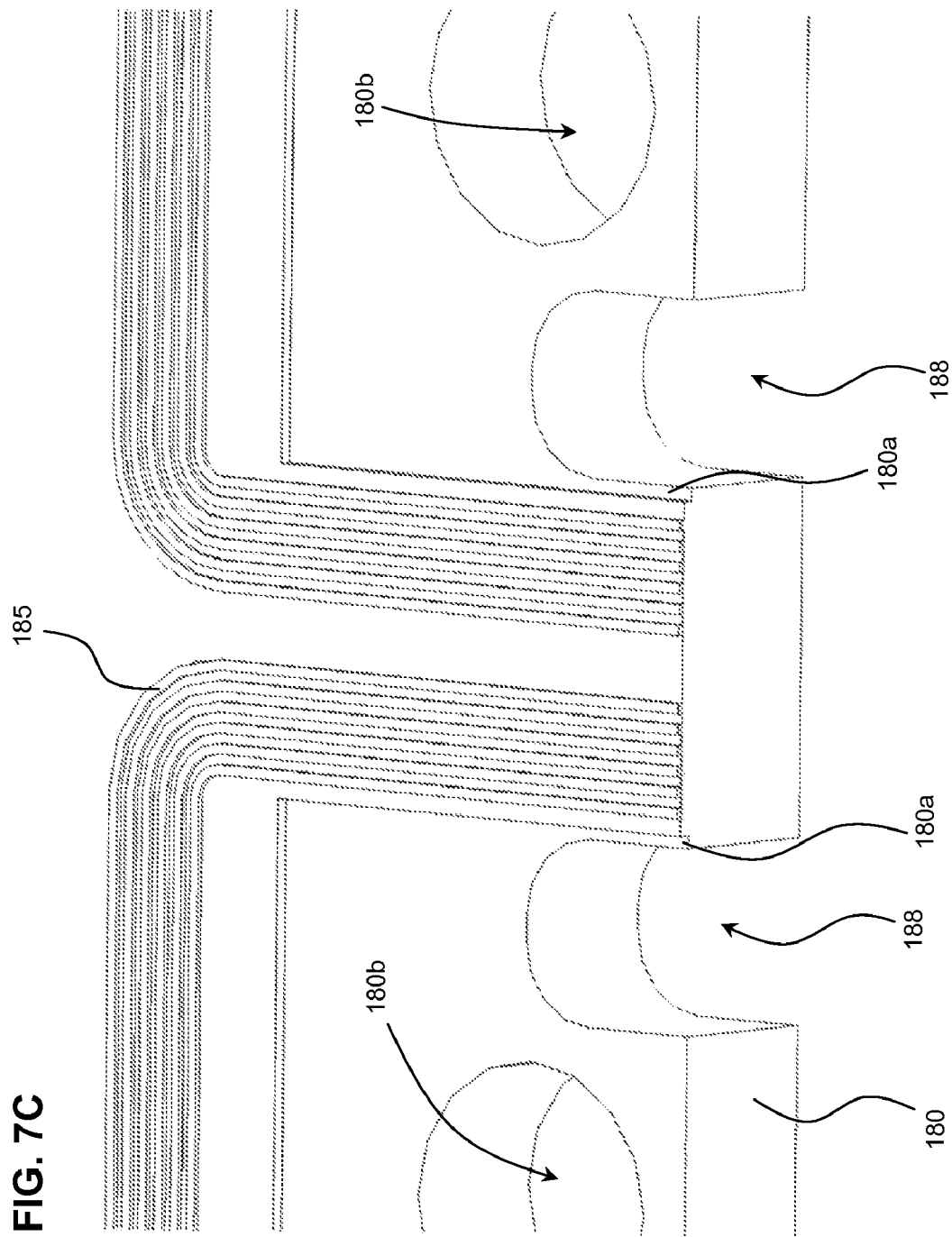

The docking block 140 and motherboard 180 according to a preferred embodiment of the present invention are shown in FIGS. 2A, 2B, 3, 4A-4E, and 7A-7C. The motherboard 180 includes a plurality of fiber traces 185 and a plurality of docking block holes 181. The fiber traces 185 can be made from a fiber optic material or any other suitable optical waveguide material. Typically, the fiber traces 185 are covered by a cladding material. However, it is possible to omit a cladding material. The fiber traces 185 route light on the motherboard 180. FIG. 7C shows fiber traces 185 having a rectangular cross-section. Although a rectangular cross-section is preferred, the shape of the cross-section of the fiber traces 185 can be other than rectangular. The size of the fiber traces 185 is exaggerated for illustration purposes. The size of the fiber traces can vary depending upon the application. The number of fiber traces 185 and the number of docking block holes 181 can each vary from one to many depending on the application.

Each of the docking block holes 181 includes a pair of slots 188 that locate a lens holder 184 with respect to that docking block hole 181. The lens holder 184 is attached to the motherboard 180 by heat stakes 182 through holes 180b in the motherboard 180. However, the lens holder 184 can be attached to the motherboard 180 in any suitable manner. The lens holder 184 is positioned relative to the fiber traces 185 by use of the edge 184a of the lens holder 184 and the ledge 180a of the motherboard 180. The edge 184a of the lens holder 184 and the ledge 180a of the motherboard 180 have tighter tolerances than either the tolerances between the lens holder 184 and the slots 188 or the tolerances between the heat stakes 182 and holes 180b. The exact arrangement of the slots 188, holes 180b, and ledges 180a is unimportant, as long as the alignment of the lens holder 184 and the fiber traces 185 is correct.

Lens holder 184 preferably includes guide pins 183 and alignment holes 186. Lenses 187 are attached to the lens holder 184. It is also possible that the lenses 187 and lens holder 184 form an integral structure. If the lenses 187 are attached to the lens holder 184, then the bottom surface of the lens holder 184 is arranged to be flush with the bottom of the portion of the motherboard 180 between the slots 188. This arrangement ensures proper alignment of the lenses 187 with the fiber traces 185.

Guide pins 183 are used to locate the docking block 140 within the docking block hole 181. Guide pins 183 are polarized by having various sizes, which ensures that the orientation of the docking block 140 is correct. Polarization of the guide pins can also be achieved by varying the shape of the guide pins 183 or by varying both the size and shape of the guide pins 183. It is possible to have guide pins 183 that are not polarized, but more care will be needed when assembling the docking block 140 and the motherboard 180 to ensure that the orientation of the docking block 140 is correct.

Alignment holes 186 extend through both the lens holder 184 and lenses 187. The alignment holes 186 are used to engage the alignment pegs 106 of the connector 100 such that lenses 110 and lenses 187 are aligned. Lenses 110 and lenses 187 must be carefully aligned to ensure that light can be transmitted between the motherboard 180 and the connector 100. This will be explained in detail below in Operation of Connector Assembly 200 section.

Although not illustrated, it is also possible that the motherboard 180 includes conductive traces, in addition to fiber traces, for transmitting electrical power or electrical signals or both.

A docking block 140 according to a preferred embodiment of the present invention is shown by itself in FIGS. 2A and 2B. The docking block 140 can be made of plastic or any other suitable material. The docking block 140 includes bottom wall 140a, top wall 140b, and side walls 140c, which define an opening 141 through which the connector 100 can be inserted into and removed from. The docking block 140 includes flanges 142 that include holes 142a. The docking block 140 is attached to the motherboard 180 preferably with screws (not shown) that are inserted through the holes 142a. Each flange 142 can have one or more holes 142a. It is also possible to attach the docking block 140 to the motherboard 180 by any other suitable method.

The guide holes 149 of the docking block 140 are used to locate the docking block 140 with respect to the docking block hole 181 when the guide pins 183 of the lens holder 184 are inserted into the guide holes 149 of the docking block 140. The guide holes 149 are polarized in a corresponding manner as the guide pins 183 in order to ensure the proper orientation of the docking block 140 with respect to the motherboard 180. However, as discussed above, it is not necessary for the guide holes 149 and guide pins 183 to be polarized.

In the interior of the docking block 140, nose guides 144 and neck guides 147 are provided. The nose guides 144 include opposing side surfaces 144a that define nose opening 145. Neck guides 147 extend from the opposing side surfaces 144a of the nose guides 144 toward each other. Each of the neck guides 147 includes a front surface 147a, a back surface 147b, a ramp 147c, and a side surface 147d. The opposing side surfaces 147d of the neck guides 147 define a neck opening 146. The front surface 147a and back surface 147b of each of the neck guides 147 are connected by ramp 147a.

The side walls 140c of the docking block 140, the side surfaces 144a of the nose guide 144, and the side surfaces 147d of the neck guide 147 define threes sets of guide planes that correspond to the sides 101a of housing 101, the side surfaces 120a of nose 120, and the side surfaces 121a of neck 121 and that are used to locate the lenses 110 of the connector 100 in the horizontal direction B with respect to the lenses 187 attached to the motherboard 180.

Together, the docking block 140 and the motherboard 180 define the female portion of the connector assembly 200 into which the connector 100 can be inserted and from which the connector 100 can be removed.

Operation of Connector Assembly 200

The connector assembly 200 is shown in FIG. 3, and the operation of the connector assembly 200 is shown in FIGS. 4A-4E.

The connector assembly 200 preferably relies upon three different sets of guide planes to locate the lenses 110 in the horizontal direction B. The first set of guide planes are defined by the side walls 140c of the docking block 140 and the sides 101a of housing 101. The second set of guide planes are defined by the side surfaces 144a of the nose guide 144 and the side surfaces 120a of nose 120. The third set of guide planes are defined by the side surfaces 147d of the neck guide 147 and the side surfaces 121a of neck 121. Each subsequent set of guide planes has tighter tolerances than the previous set of guide planes.

Figure 4A:
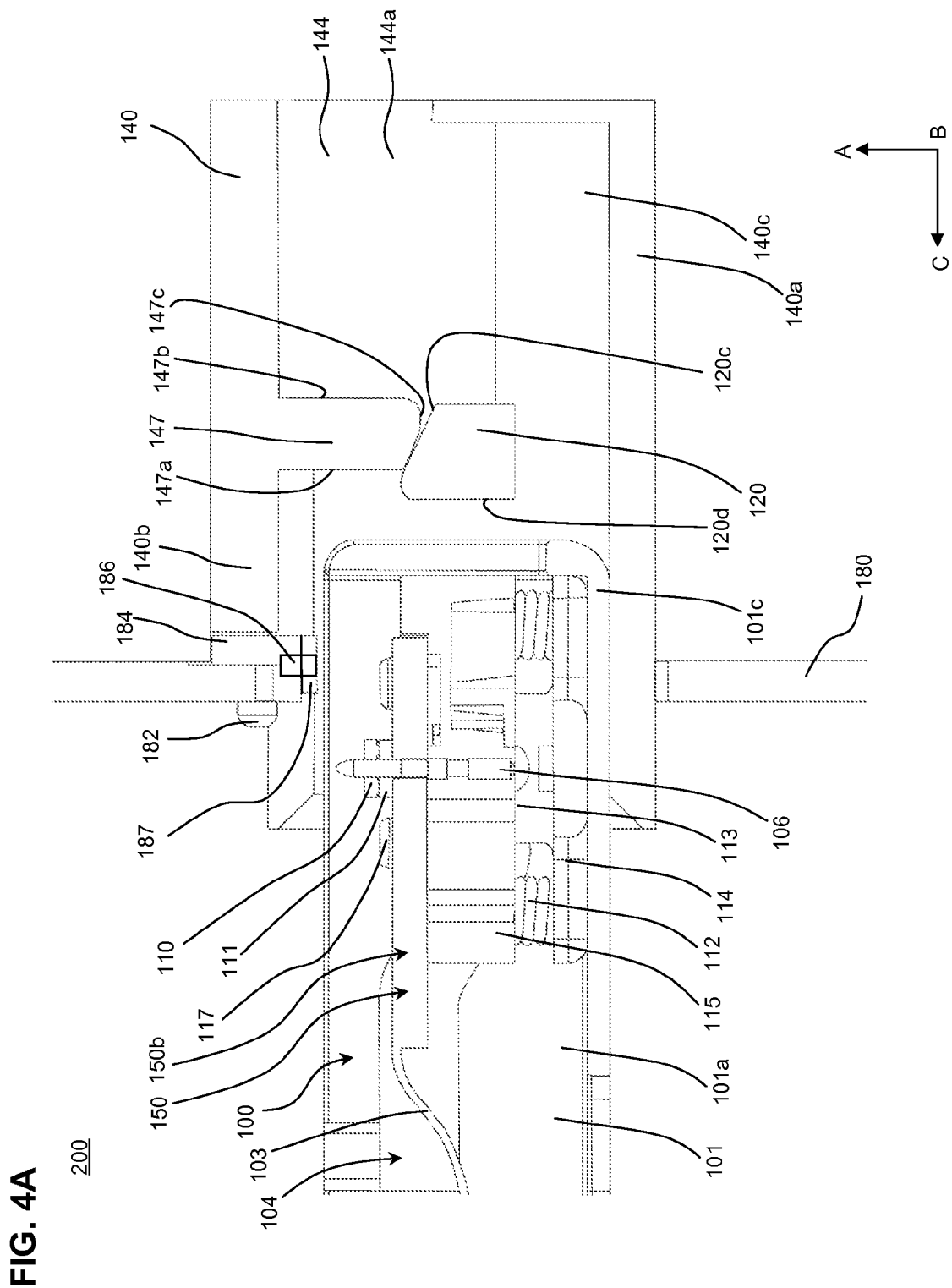
FIGS. 4A-4E are side sectional views of the connector assembly according to a preferred embodiment of the present invention.
Figure 4B:
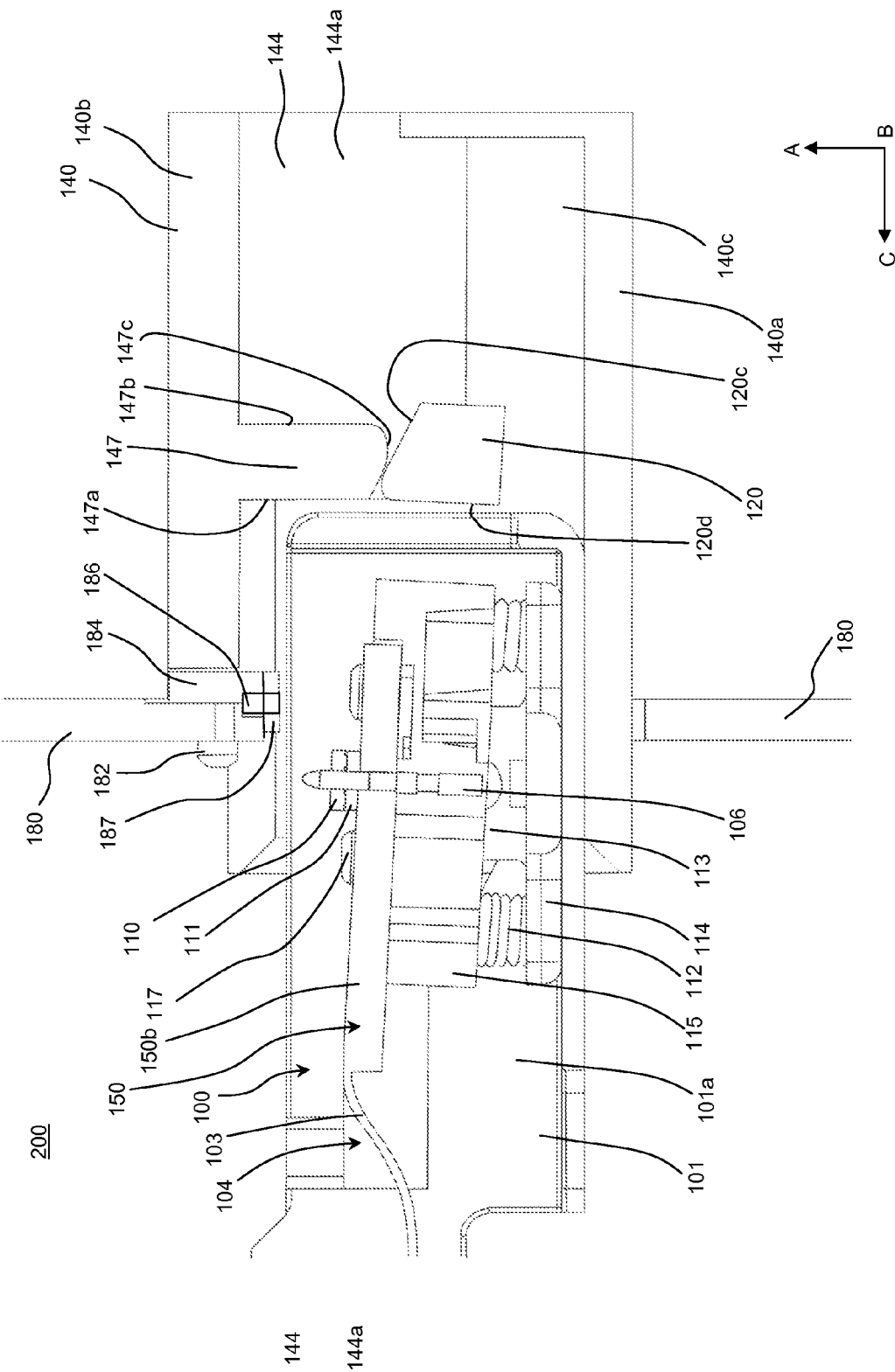
Figure 4C:
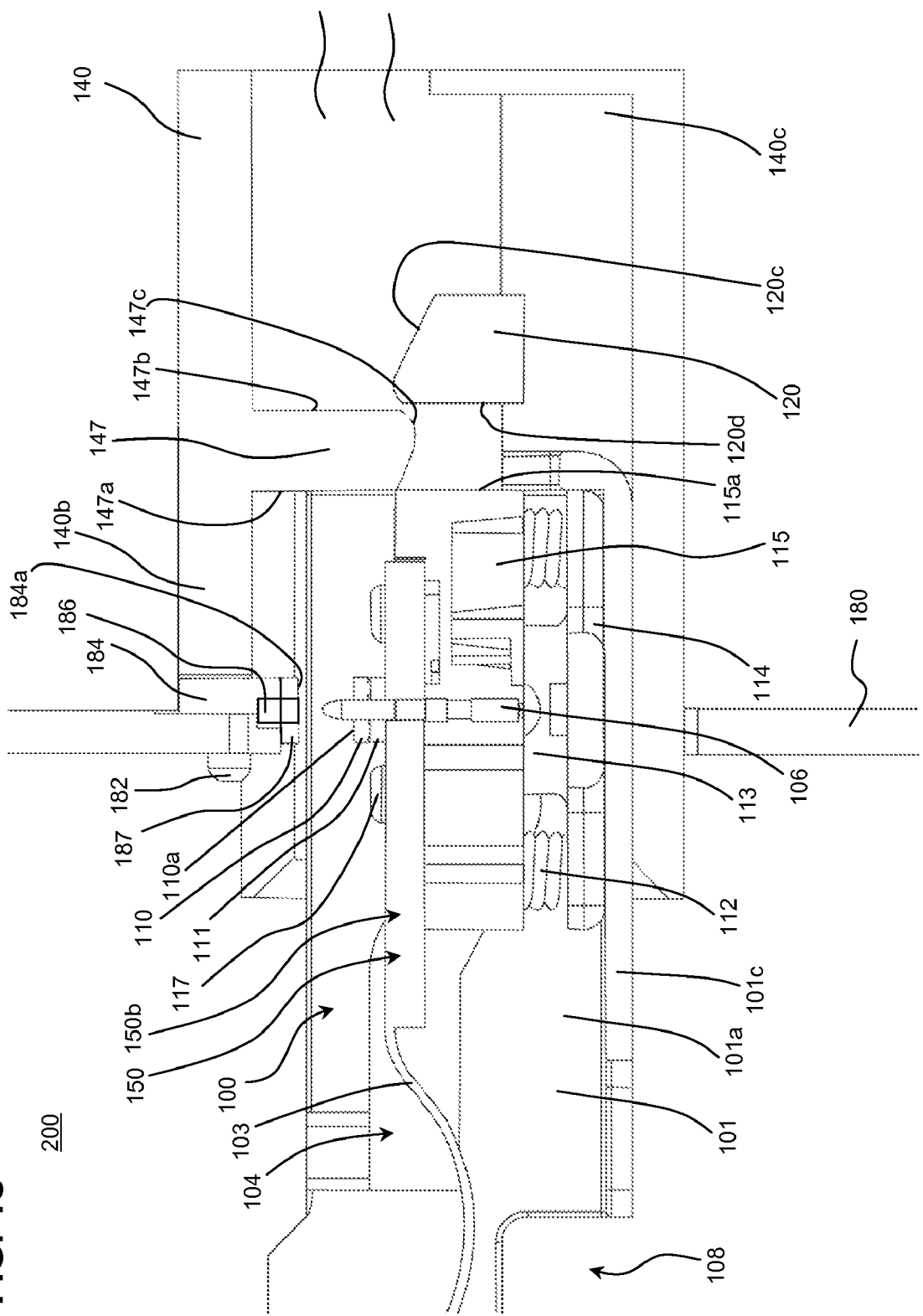

Insertion of the connector 100 into the docking block 140 is shown in FIGS. 4A-4D. In FIG. 4A, the connector 100 is inserted through the opening 141 of the docking block 140 such that the beveled top surface 120c of the nose 120 just engages the ramp 147c of the neck guide 147. At this point, the first and second set of guide planes have been engaged. For illustration purposes, the neck 121 is not shown in FIGS. 4A-4C. The first set of guide planes is engaged as soon as the connector 100 is inserted into the opening 141 of the docking block 140 because the sides 101a of housing 101 engage the side walls 140c of the docking block 140. The front of the connector 100 can have edges with rounded corners to facilitate the insertion of the connector 100 into the docking block 140.

The second set of guide planes is engaged when the nose 120 is inserted into nose opening 145 defined by the side surfaces 144a of the nose guides 144 because the side surface 120a of nose 120 engages the side surfaces 144a of the nose guide 144. As explained above in the Connector 100 and Daughterboard 190 section, the nose 120 can include beveled side surfaces 120b that facilitate the insertion of the nose 120 into the nose opening 145.

FIG. 4B shows the connector 100 being further inserted into the opening 141 of the docking block 140. As the connector is further inserted into the opening 141 of the docking block 140, the beveled top surface 120c of the nose 120 slides past the ramp 147c of the neck guide 147. As the beveled top surface 120c of the nose 120 slides past the ramp 147c of the neck guide 147, the nose 120 is pressed down toward the bottom wall 140a of the docking block 140, which, in cooperation with the bump 104b located in the cam follower 104, causes the platform 115 to be tilted. Tilting of the platform 115 allows the front surface 147a and the back surface 147b of the neck guides 147 to be located between the front surface 115a of the platform 115 and the back surface 120d of the nose, which locate the lenses 110 and 187 with respect to each other as the surfaces 110a and 187a of the lenses 110 and 187 are moved together and pulled apart. In FIG. 4B, only the first and the second set of guide planes are engaged.

FIG. 4C shows the connector 100 being even further inserted into the opening 141 of the docking block 140. During this portion of the insertion of the connector 100 into the docking block 140, the lens 110 is parallel or substantially parallel to the lens 187, which help prevents damage to the lenses 110 and 187 during the insertion of the connector 100 into the docking block 140. The lens 110 is also parallel or substantially parallel to the lens 187 when the connector 100 is removed from the docking block 140. The front portions of sides 101a of housing 101 slide past the nose guides 144. After the beveled top surface 120c of the nose 120 slides past the ramp 147c of the neck guide 147, the neck 121 enters the neck opening 146 defined by the side surfaces 147d of the neck guide 147. This causes the third set of guide planes to be engaged because the side surfaces 121a of neck 121 engage the side surfaces 147d of the neck guide 147. As explained above in the Connector 100 and Daughterboard 190 section, the neck 121 can include beveled edges 121b that facilitate the insertion of the neck 121 into the neck opening 146.

After the third set of guide planes is engaged, the front surfaces 147a of the neck guides 147 engages the front surface of the platform 115. The front surfaces 147a of the neck guides 147 and the front surface 115a of the platform 115 remain in contact as the housing 101 continues to move forward. The cam rod 105, the cam follower 104, and the springs 112 work in cooperation to push the platform 115 away from the bottom 101c of the housing 101. This moves the surface 110a of lens 110 towards surface 187a of the lens 187 that come into contact with each other, as the front surfaces 147a of the neck guides 147 and the front surface 115a of the platform 115 maintain the alignment pegs 106 in correct location as the platform 115 is pushed away from the bottom 101c of the housing 101.

Figure 4D:
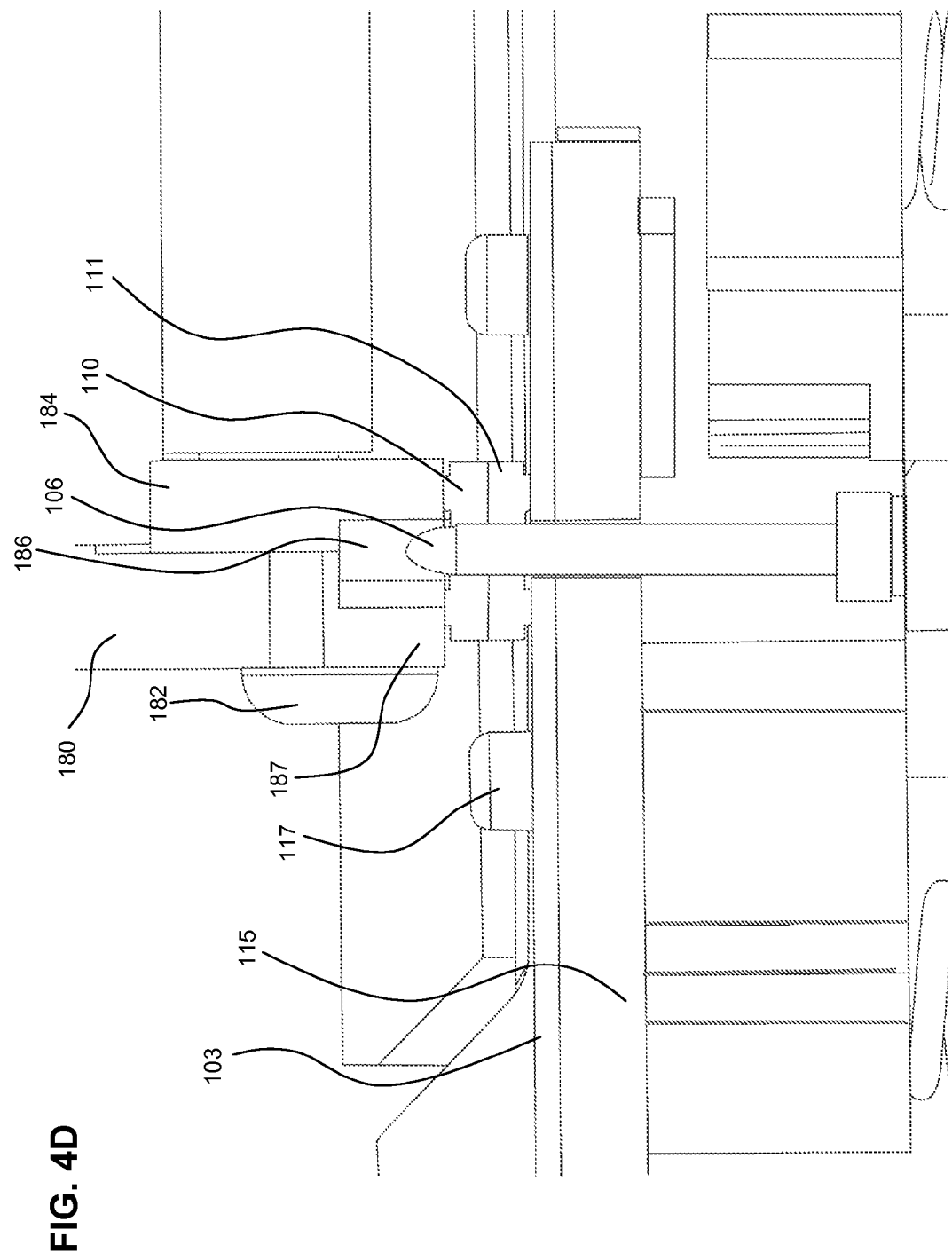
Figure 4E:
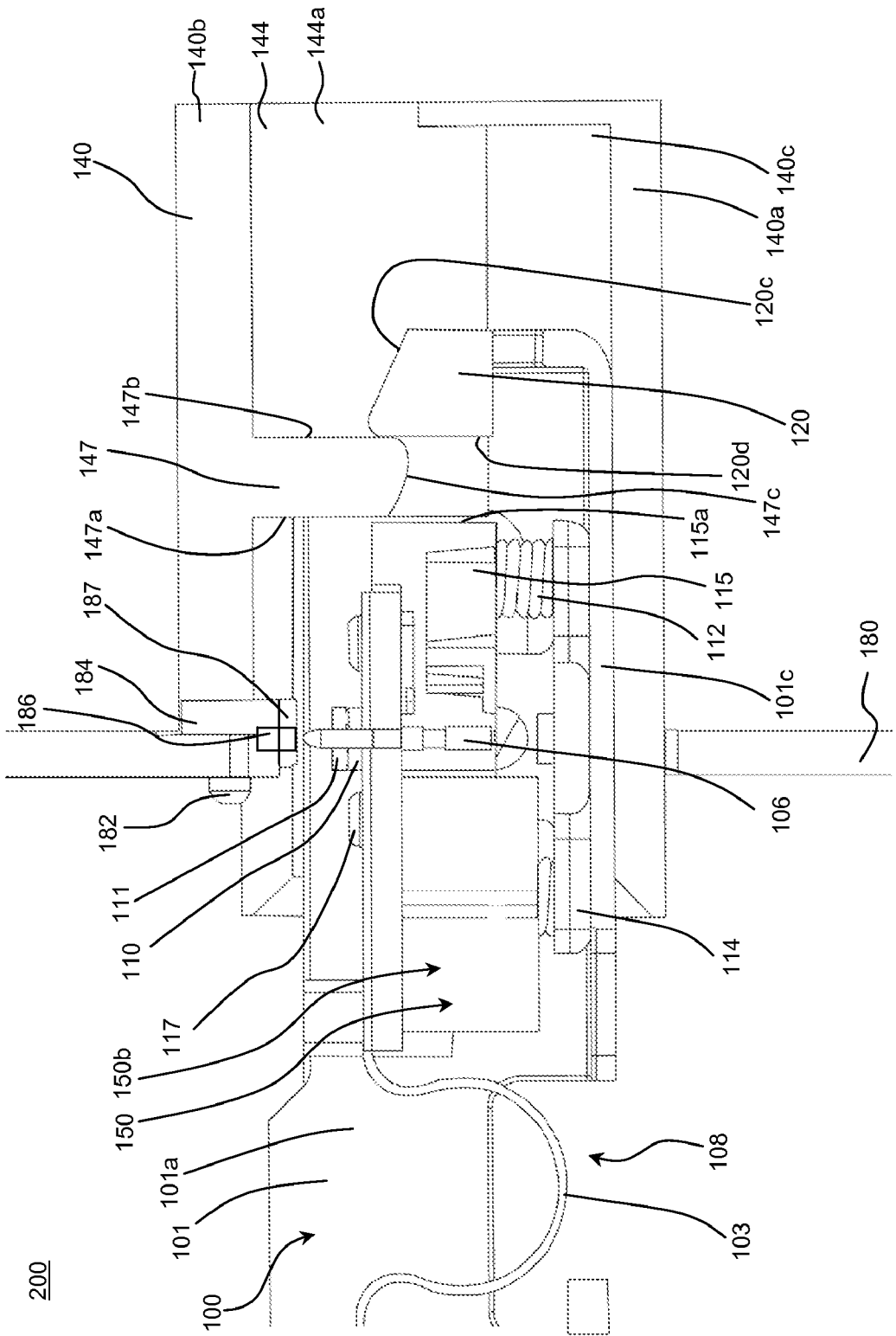

As the cam rod 105 continues to move forward, the platform 115 is moved further away from the bottom 101c of the housing 101 towards the top wall 140b of the docking block 140, which brings the surface 187a of lens 187 and the surface 110a of lens 110 closer together. As seen in FIG. 4D, the alignment pegs 106 are inserted into the alignment holes 186 in lenses 187. The ends of the alignment pegs 106 that are inserted into alignment holes 186 preferably have a bullet shape. However, any other suitable shape that provides a lead in can also be used.

Because the platform 115 is accurately located with respect to the lenses 187, the lenses 110 on the platform 115 are aligned with the lenses 187, which is required for light to be transmitted from the motherboard 180 to the connector 100. When the bullet shaped ends of the alignment pegs 106 are inserted into the alignment holes 186, the cam rods 105 float in the cam follower 104 such that the cam rods 105 do not touch the sides of the cam follower 104, which results in the surface 110a of lens 110 and the surface 187a of lens 187 being held together tightly with the resulting force of the springs 112 and which results in the platform 115 floating and only being maintained in position by the spring forces of the springs 112 and alignment pegs 106.

Because the platform 115 floats, movement in the motherboard 180 or connector 100 is not transmitted to the lenses 110 and 187, which would result in misalignment, and the alignment of the lenses 110 and 187 is not affected by misalignment, vibration, shock, manufacturing tolerances, or daughtercard 190 insertion depth. With respect to the daughtercard 190 insertion depth, the float of the platform 115 allows for the daughtercard 190 to be over inserted, i.e., the lens 110 makes contact with lens 187 before the connector 100 is fully inserted into the docking block 140.

The alignment pegs 106 are prevented from disengaging from the alignment holes 186 by the springs 112. By this arrangement, accurate alignment and constant contact of the surface 110a of lens 110 and the surface 187a of lens 187 is consistently and reliably achieved.

FIG. 4E shows the connector 100 being removed from the docking block 140 through opening 141. The lens 110 is maintained in parallel or substantially parallel position with respect to the lens 187 as the connector 100 is removed from the docking block 140. When the connector 100 is removed from the docking block 140, the back surfaces 147b of the neck guides 147 engage the back surface 120d of the nose 120. The cam rod 105, the cam follower 104, and the springs 112 work in cooperation to push the platform 115 toward the bottom 101c of the housing 101, as the back surfaces 147b of the neck guides 147 and back surface 120d of the nose 120 maintain the location of the lenses 110 and 187 such that no forces in the insertion/removal directions are transmitted to the alignment pegs 106 and alignment holes 186 which would result in possible damage to the lenses 110 and 187. This results in the lenses 110 and 187 being pulled away from each other.

As the cam rods 105 slide past the bumps 104b, the platform 115 is tilted such that the nose 120 moves toward the bottom 101c of the housing 101. This causes the back surfaces 147b of the neck guides 147 to be disengaged from the back surface 120d of nose 120. After the back surfaces 147b of the neck guides 147 are disengaged from the back surface 120d of nose 120, the connector can easily be removed from the docking block 140 through opening 141.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A connector comprising:
    an optical lens;
    an electrical/optical converter;
    an electrical connector;
    a flexible circuit connecting the optical lens and the electrical connector;
    a housing; and
    a platform; wherein the platform is located in the housing and is movable within the housing.

2. A connector according to claim 1, wherein the optical lens and the electrical/optical converter are located on the platform.

3. A connector according to claim 1, wherein the housing includes at least one cam follower.

4. A connector according to claim 3, wherein the platform includes a cam member that is located in the cam follower and is movable within the cam follower.

5. A connector according to claim 4, wherein the location of the platform in a vertical direction with respect to a bottom surface of the housing is determined by the location of the cam member within the cam follower.

6. A connector according to claim 1, further comprising a base that is connected to the platform, that is located within the housing, and that is movable within the housing.

7. A connector according to claim 6, wherein the base is connected to the platform by at least one spring.

8. A connector according to claim 1, wherein one end of the flexible circuit is movable within a housing and another end of the flexible circuit is attached to the housing so as not to be movable with respect to the housing.

9. A connector according to claim 8, wherein the optical lens is attached to the one end of the flexible circuit that is movable within the housing.

10. A connector according to claim 1, wherein the optical lens is arranged to float as the connector is mated to a motherboard.

11. A connector according to claim 1, wherein the optical lens of the connector is arranged to make contact with an optical lens of a motherboard as the connector is mated to the motherboard; and
    only the mating of the connector and the motherboard is required for the optical lens of the connector and the optical lens of the motherboard to make contact.

12. A connector according to claim 1, wherein the optical lens is arranged to make contact with an optical lens of a motherboard before the connector is fully mated with the motherboard.

13. A connector according to claim 1, wherein the optical lens of the connector is arranged such that, during mating and un-mating of the connector and a motherboard, the optical lens is parallel or substantially parallel to an optical lens of the motherboard.

14. A connector according to claim 1, wherein the optical lens of the connector is arranged such that, as the connector is mated to a motherboard, only normal forces are applied to the optical lens of the connector and an optical lens of the motherboard.

* * * * *